United States Patent
Syrjarinne et al.

(10) Patent No.: US 9,622,040 B2
(45) Date of Patent: Apr. 11, 2017

(54) HANDLING PACKET DATA UNITS

(71) Applicant: Nokia Technologies Oy, Espoo (FI)

(72) Inventors: Jari Tapani Syrjarinne, Tampere (FI); Juha Salokannel, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/648,867

(22) PCT Filed: Dec. 7, 2012

(86) PCT No.: PCT/IB2012/057071
§ 371 (c)(1),
(2) Date: Jun. 1, 2015

(87) PCT Pub. No.: WO2014/087199
PCT Pub. Date: Jun. 12, 2014

(65) Prior Publication Data
US 2015/0350839 A1      Dec. 3, 2015

(51) Int. Cl.
*H04W 64/00* (2009.01)
*H04W 4/02* (2009.01)
*G01S 5/00* (2006.01)
*G01S 5/06* (2006.01)
*H04W 4/22* (2009.01)
(Continued)

(52) U.S. Cl.
CPC .......... *H04W 4/026* (2013.01); *G01C 21/206* (2013.01); *G01S 1/02* (2013.01); *G01S 1/44* (2013.01); *G01S 5/0045* (2013.01); *G01S 5/02* (2013.01); *G01S 5/06* (2013.01); *H04W 4/04* (2013.01); *H04W 4/22* (2013.01); *H04W 64/00* (2013.01)

(58) Field of Classification Search
CPC ......... H04W 4/026; H04W 4/04; H04W 4/22; H04W 64/00; G01C 21/206; G01S 1/02; G01S 1/44; G01S 5/0045; G01S 5/02; G01S 5/06
USPC ...................................................... 455/404.2
See application file for complete search history.

(56) References Cited

U.S. PATENT DOCUMENTS 7,656,822 B1    2/2010  AbdelAziz et al.
9,213,081 B2 *  12/2015 Tarlow .................. G01S 5/0257
(Continued)

FOREIGN PATENT DOCUMENTS

EP    1280030 A1    1/2003
EP    1418781 A1    5/2004
(Continued)

OTHER PUBLICATIONS

International Search Report and Written Opinion received for corresponding Patent Cooperation Treaty Application No. PCT/IB2012/057071, dated Sep. 19, 2013, 13 pages.
(Continued)

*Primary Examiner* — Nathan Taylor
(74) *Attorney, Agent, or Firm* — Locke Lord LLP

(57) ABSTRACT

Apparatus is configured: to transmit angle-of-departure positioning messages from which a mobile device can calculate a direction to the mobile device from the apparatus; and to transmit a point of interest packet data unit for providing an emergency navigation service to a mobile device, the point of interest packet data unit comprising first data indicating a location of a first emergency point of interest and data indicating that the location relates to an emergency point of interest.

11 Claims, 7 Drawing Sheets

(51) Int. Cl.
*H04W 4/04* (2009.01)
*G01S 1/02* (2010.01)
*G01S 5/02* (2010.01)
*G01S 1/44* (2006.01)
*G01C 21/20* (2006.01)

(56) References Cited

U.S. PATENT DOCUMENTS

| | | |
|---|---|---|
| 2006/0267794 A1 | 11/2006 | Lee et al. |
| 2007/0001904 A1 | 1/2007 | Mendelson |
| 2008/0124074 A1 | 5/2008 | Yang et al. |
| 2008/0161026 A1 | 7/2008 | Wiatrowski et al. |
| 2009/0170529 A1* | 7/2009 | Kane .............. H04W 4/22 455/456.3 |
| 2009/0201850 A1* | 8/2009 | Davis .............. G01S 5/0009 370/328 |
| 2010/0105409 A1 | 4/2010 | Agarwal et al. |
| 2010/0302102 A1* | 12/2010 | Desai .............. G01S 3/50 342/417 |
| 2011/0072479 A1 | 3/2011 | Hsu et al. |
| 2012/0028654 A1 | 2/2012 | Gupta et al. |
| 2012/0059584 A1* | 3/2012 | Nesbitt .............. G01C 21/00 701/527 |
| 2012/0178471 A1* | 7/2012 | Kainulainen ......... G01S 5/0009 455/456.1 |
| 2012/0235812 A1 | 9/2012 | Maia et al. |
| 2012/0258669 A1* | 10/2012 | Honkanen .............. G01S 3/46 455/67.11 |
| 2012/0289241 A1 | 11/2012 | Kalliola et al. |
| 2012/0289243 A1* | 11/2012 | Tarlow .............. G01S 5/0072 455/456.1 |
| 2013/0065584 A1 | 3/2013 | Lyon et al. |
| 2014/0066091 A1 | 3/2014 | Varoglu et al. |

FOREIGN PATENT DOCUMENTS

| | | |
|---|---|---|
| EP | 2211195 A1 | 7/2010 |
| EP | 2474834 | 7/2012 |
| EP | 2509343 | 10/2012 |
| EP | 2523013 | 11/2012 |
| WO | 2005/091573 A1 | 9/2005 |
| WO | 2007/099196 A1 | 9/2007 |
| WO | 2007131225 | 11/2007 |
| WO | 2008/124074 A1 | 10/2008 |
| WO | 2012/152988 A1 | 11/2012 |

OTHER PUBLICATIONS

International Search Report and Written Opinion received for corresponding Patent Cooperation Treaty Application No. PCT/IB2012/057070, dated Sep. 9, 2013, 14 pages.

International Search Report and Written Opinion received for corresponding Patent Cooperation Treaty Application No. PCT/IB2012/057066, dated Sep. 24, 2013, 15 pages.

International Search Report and Written Opinion received for corresponding Patent Cooperation Treaty Application No. PCT/IB2012/057067, dated Oct. 9, 2013, 16 pages.

"Bluetooth Specification Version 4.0", Specification of the Bluetooth System, Jun. 30, 2010, 2302 pages.

"IEEE Standard for Local and Metropolitan Area Networks:Overview and Architecture", IEEE Standard 802-2001, Mar. 8, 2002, pp. 1-48.

Non-Final Office action received for corresponding U.S. Appl. No. 14/648,585, dated Dec. 16, 2015, 12 pages.

Extended European Search Report received for corresponding European Patent Application No. 12889425.0, dated Mar. 16, 2016, 5 pages.

Non-Final Office action received for corresponding U.S. Appl. No. 14/648,235, dated Mar. 29, 2016, 11 pages.

Extended European Search Report received for corresponding European Patent Application No. 12889722.0, dated May 11, 2016, 6 pages.

Non-Final Office action received for corresponding U.S. Appl. No. 14/649,432, dated Jun. 20, 2016, 17 pages.

Extended European Search Report received for corresponding European Patent Application No. 12889705.5, dated Jun. 22, 2016, 8 pages.

Extended European Search Report received for corresponding European Patent Application No. 12889621.4, dated Jun. 27, 2016, 11 pages.

Kalliola, "Challenges of Indoor Positioning", Nokia Research Center, 2009, 16 pages.

* cited by examiner

| bit 0 | bit 1 | bit 2 | bit 3 | bit 4 | bit 5 | bit 6 | bit 7 |
|---|---|---|---|---|---|---|---|
| Entry/Exit | Heading | Range | Range | Range | Range | Range | Range |

Trigger Type Heading        Range

FIG. 7

HANDLING PACKET DATA UNITS

RELATED APPLICATION

This application was originally filed as PCT Application No. PCT/IB2012/057071 filed Dec. 7, 2012.

FIELD

The present application relates to handling packet data units.

BACKGROUND

Bluetooth Low Energy (BLE) is a new wireless communication technology published by the Bluetooth SIG as a component of Bluetooth Core Specification Version 4.0 BLE is a lower power, lower complexity, and lower cost wireless communication protocol, designed for applications requiring lower data rates and shorter duty cycles. Inheriting the protocol stack and star topology of classical Bluetooth, BLE redefines the physical layer specification, and involves many new features such as a very-low power idle mode, a simple device discovery, and short data packets, etc.

BLE technology is aimed at devices requiring a low power consumption, for example devices that may operate with one or more button cell batteries such as sensors, key fobs, and/or the like. BLE can also be incorporated into devices such as mobile phones, smart phones, tablet computers, laptop computers, desktop computers etc.

SUMMARY

Various aspects of examples of the invention are set out in the claims.

A first aspect of the invention provides apparatus configured:
- to transmit angle-of-departure positioning messages from which a mobile device can calculate a direction to the mobile device from the apparatus; and
- to transmit a point of interest packet data unit for providing an emergency navigation service to a mobile device, the point of interest packet data unit comprising first data indicating a location of a first emergency point of interest and data indicating that the location relates to an emergency point of interest.

The point of interest packet data unit may additionally comprise second data indicating a location of a second point of interest.

The point of interest packet data unit may additionally comprise data indicating that the location of the second point of interest relates to an emergency point of interest.

The second data may indicate a range from the location of the second point of interest.

The first data may indicate a range from the location of the first emergency point of interest.

The point of interest packet data unit may additionally comprise second data indicating a location of a second point of interest, third data indicating a location of a third point of interest, and data indicating that the locations of the second and third points of interest relate to emergency points of interest.

The first to third data may be ordered in the point of interest packet data unit such that a distance between the locations of the first and second emergency points of interest is less than a distance between the locations of the first and third emergency points of interest.

The location of the first emergency point of interest may be closer to an emergency exit that the location of the second and third emergency points of interest, and wherein the first data may be provided closer that the second and third data to the beginning of the point of interest packet data unit.

The data indicating that a location relates to an emergency point of interest may consist of a single bit of the point of interest packet data unit.

The data indicating that the location of the first point of interest relates to an emergency point of interest may consist of a single bit of the point of interest packet data unit that is within the same octet as data indicating that the location of the second point of interest relates to an emergency point of interest.

The octet may also include data indicating that the packet data unit is a point of interest packet data unit.

The packet data unit may be transmitted in a first positioning message that is separate from the angle of departure positioning messages.

The first positioning message may be a Bluetooth message, for instance a Bluetooth advertising message.

The first positioning message may be a Bluetooth Low Energy message, for instance a Bluetooth Low Energy advertising message.

A second aspect of the invention provides apparatus configured:
- to receive at least one angle-of-departure positioning message from a positioning beacon;
- to receive a point of interest packet data unit from the positioning beacon, the point of interest packet data unit comprising first data indicating a location of a first emergency point of interest and data indicating that the location relates to an emergency point of interest;
- to use the angle-of-departure positioning message to calculate a position of the apparatus; and
- when emergency navigation is enabled, to provide an output indicating a heading to the location of the first point of interest.

The apparatus may be configured:
- when emergency navigation is enabled, to provide an output indicating a range to the location of the first point of interest as well as the heading to the first point of interest.

The point of interest packet data unit may additionally comprise second data indicating a location of a second point of interest and wherein the apparatus may be configured, when emergency navigation is enabled, to provide an output indicating a heading to the location of the second point of interest.

The apparatus may be configured, when emergency navigation is enabled, to provide an output indicating a range to the location of the second point of interest as well as the heading to the second point of interest.

The apparatus may be configured to cease providing the heading to the second location and to start providing the heading to the first location upon determining that the apparatus is located at the second emergency point of interest.

The apparatus may be configured to determine that the apparatus is located at the second emergency point of interest by determining that the apparatus is at a location that is at distance from the location of the second emergency point of interest that is less than a distance defined by range information decoded from the point of interest packet data unit.

The apparatus may be a communication module and wherein the apparatus may be configured to provide the notification by providing a notification to a software application that is external to the communication module.

A third aspect of the invention provides a method comprising:
- transmitting angle-of-departure positioning messages from which a mobile device can calculate a direction to the mobile device from the apparatus; and
- transmitting a point of interest packet data unit for providing an emergency navigation service to a mobile device, the point of interest packet data unit comprising first data indicating a location of a first emergency point of interest and data indicating that the location relates to an emergency point of interest.

The point of interest packet data unit may additionally comprise second data indicating a location of a second point of interest.

The point of interest packet data unit may additionally comprise data indicating that the location of the second point of interest relates to an emergency point of interest.

The second data may indicate a range from the location of the second point of interest.

The first data may indicate a range from the location of the first emergency point of interest.

The point of interest packet data unit may additionally comprise second data indicating a location of a second point of interest, third data indicating a location of a third point of interest, and data indicating that the locations of the second and third points of interest relate to emergency points of interest.

The first to third data may be ordered in the point of interest packet data unit such that a distance between the locations of the first and second emergency points of interest is less than a distance between the locations of the first and third emergency points of interest.

The location of the first emergency point of interest may be closer to an emergency exit that the location of the second and third emergency points of interest, and wherein the first data may be provided closer that the second and third data to the beginning of the point of interest packet data unit.

The data indicating that a location relates to an emergency point of interest may consist of a single bit of the point of interest packet data unit.

The data indicating that the location of the first point of interest relates to an emergency point of interest may consist of a single bit of the point of interest packet data unit that is within the same octet as data indicating that the location of the second point of interest relates to an emergency point of interest.

The octet may also include data indicating that the packet data unit is a point of interest packet data unit.

The packet data unit may be transmitted in a first positioning message that is separate from the angle of departure positioning messages.

The first positioning message may be a Bluetooth message, for instance a Bluetooth advertising message.

The first positioning message may be a Bluetooth Low Energy message, for instance a Bluetooth Low Energy advertising message.

A fourth aspect of the invention provides a method comprising:
- receiving at least one angle-of-departure positioning message from a positioning beacon;
- receiving a point of interest packet data unit from the positioning beacon, the point of interest packet data unit comprising first data indicating a location of a first emergency point of interest and data indicating that the location relates to an emergency point of interest;
- using the angle-of-departure positioning message to calculate a position of an apparatus for performing the method; and
- when emergency navigation is enabled, providing an output indicating a heading to the location of the first point of interest.

The method may further comprise:
- when emergency navigation is enabled, providing an output indicating a range to the location of the first point of interest as well as the heading to the first point of interest.

The point of interest packet data unit may additionally comprise second data indicating a location of a second point of interest and wherein the method may comprise, when emergency navigation is enabled, providing an output indicating a heading to the location of the second point of interest.

The method may further comprise, when emergency navigation is enabled, providing an output indicating a range to the location of the second point of interest as well as the heading to the second point of interest.

The method may further comprise ceasing providing the heading to the second location and starting to provide the heading to the first location upon determining that apparatus performing the method is located at the second emergency point of interest.

The method may further comprise determining that the apparatus is located at the second emergency point of interest by determining that the apparatus is at a location that is at distance from the location of the second emergency point of interest that is less than a distance defined by range information decoded from the point of interest packet data unit.

The apparatus may be a communication module and the method may further comprise the apparatus providing the notification by providing a notification to a software application that is external to the communication module.

A fifth aspect of the invention provides a computer program comprising instructions that when executed by a computer apparatus control it to perform the method of the third or fourth aspects of the invention.

A sixth aspect of the invention provides apparatus, the apparatus having at least one processor and at least one memory having computer-readable code stored thereon which when executed controls the at least one processor:
- to transmit angle-of-departure positioning messages from which a mobile device can calculate a direction to the mobile device from the apparatus; and
- to transmit a point of interest packet data unit for providing an emergency navigation service to a mobile device, the point of interest packet data unit comprising first data indicating a location of a first emergency point of interest and data indicating that the location relates to an emergency point of interest.

The point of interest packet data unit may additionally comprise second data indicating a location of a second point of interest.

The point of interest packet data unit may additionally comprise data indicating that the location of the second point of interest relates to an emergency point of interest.

The second data may indicate a range from the location of the second point of interest.

The first data may indicate a range from the location of the first emergency point of interest.

The point of interest packet data unit may additionally comprise second data indicating a location of a second point of interest, third data indicating a location of a third point of interest, and data indicating that the locations of the second and third points of interest relate to emergency points of interest.

The first to third data may be ordered in the point of interest packet data unit such that a distance between the locations of the first and second emergency points of interest is less than a distance between the locations of the first and third emergency points of interest.

The location of the first emergency point of interest may be closer to an emergency exit that the location of the second and third emergency points of interest, and wherein the first data may be provided closer that the second and third data to the beginning of the point of interest packet data unit.

The data indicating that a location relates to an emergency point of interest may consist of a single bit of the point of interest packet data unit.

The data indicating that the location of the first point of interest relates to an emergency point of interest may consist of a single bit of the point of interest packet data unit that is within the same octet as data indicating that the location of the second point of interest relates to an emergency point of interest.

The octet may also include data indicating that the packet data unit is a point of interest packet data unit.

The packet data unit may be transmitted in a first positioning message that is separate from the angle of departure positioning messages.

The first positioning message may be a Bluetooth message, for instance a Bluetooth advertising message.

The first positioning message may be a Bluetooth Low Energy message, for instance a Bluetooth Low Energy advertising message.

A seventh aspect of the invention provides apparatus, the apparatus having at least one processor and at least one memory having computer-readable code stored thereon which when executed controls the at least one processor:
to receive at least one angle-of-departure positioning message from a positioning beacon;
to receive a point of interest packet data unit from the positioning beacon, the point of interest packet data unit comprising first data indicating a location of a first emergency point of interest and data indicating that the location relates to an emergency point of interest;
to use the angle-of-departure positioning message to calculate a position of the apparatus; and
when emergency navigation is enabled, to provide an output indicating a heading to the location of the first point of interest.

The computer-readable code when executed may control the at least one processor:
when emergency navigation is enabled, to provide an output indicating a range to the location of the first point of interest as well as the heading to the first point of interest.

The point of interest packet data unit may additionally comprise second data indicating a location of a second point of interest and wherein the computer-readable code when executed may control the at least one processor, when emergency navigation is enabled, to provide an output indicating a heading to the location of the second point of interest.

The computer-readable code when executed may control the at least one processor, when emergency navigation is enabled, to provide an output indicating a range to the location of the second point of interest as well as the heading to the second point of interest.

The computer-readable code when executed may control the at least one processor to cease providing the heading to the second location and to start providing the heading to the first location upon determining that the apparatus is located at the second emergency point of interest.

The computer-readable code when executed may control the at least one processor to determine that the apparatus is located at the second emergency point of interest by determining that the apparatus is at a location that is at distance from the location of the second emergency point of interest that is less than a distance defined by range information decoded from the point of interest packet data unit.

The apparatus may be a communication module and the computer-readable code when executed may control the at least one processor to provide the notification by providing a notification to a software application that is external to the communication module.

An eighth aspect of the invention provides a non-transitory computer-readable storage medium having stored thereon computer-readable code, which, when executed by computing apparatus, causes the computing apparatus to perform a method comprising:
transmitting angle-of-departure positioning messages from which a mobile device can calculate a direction to the mobile device from the apparatus; and
transmitting a point of interest packet data unit for providing an emergency navigation service to a mobile device, the point of interest packet data unit comprising first data indicating a location of a first emergency point of interest and data indicating that the location relates to an emergency point of interest.

The point of interest packet data unit may additionally comprise second data indicating a location of a second point of interest.

The point of interest packet data unit may additionally comprise data indicating that the location of the second point of interest relates to an emergency point of interest.

The second data may indicate a range from the location of the second point of interest.

The first data may indicate a range from the location of the first emergency point of interest.

The point of interest packet data unit may additionally comprise second data indicating a location of a second point of interest, third data indicating a location of a third point of interest, and data indicating that the locations of the second and third points of interest relate to emergency points of interest.

The first to third data may be ordered in the point of interest packet data unit such that a distance between the locations of the first and second emergency points of interest is less than a distance between the locations of the first and third emergency points of interest.

The location of the first emergency point of interest may be closer to an emergency exit that the location of the second and third emergency points of interest, and wherein the first data may be provided closer that the second and third data to the beginning of the point of interest packet data unit.

The data indicating that a location relates to an emergency point of interest may consist of a single bit of the point of interest packet data unit.

The data indicating that the location of the first point of interest relates to an emergency point of interest may consist of a single bit of the point of interest packet data unit that is within the same octet as data indicating that the location of the second point of interest relates to an emergency point of interest.

The octet may also include data indicating that the packet data unit is a point of interest packet data unit.

The packet data unit may be transmitted in a first positioning message that is separate from the angle of departure positioning messages.

The first positioning message may be a Bluetooth message, for instance a Bluetooth advertising message.

The first positioning message may be a Bluetooth Low Energy message, for instance a Bluetooth Low Energy advertising message.

A ninth aspect of the invention provides a non-transitory computer-readable storage medium having stored thereon computer-readable code, which, when executed by computing apparatus, causes the computing apparatus to perform a method comprising:

receiving at least one angle-of-departure positioning message from a positioning beacon;

receiving a point of interest packet data unit from the positioning beacon, the point of interest packet data unit comprising first data indicating a location of a first emergency point of interest and data indicating that the location relates to an emergency point of interest;

using the angle-of-departure positioning message to calculate a position of the apparatus; and when emergency navigation is enabled, providing an output indicating a heading to the location of the first point of interest.

The computer-readable code, when executed by the computing apparatus, may cause the computing apparatus to perform a method comprising:

when emergency navigation is enabled, providing an output indicating a range to the location of the first point of interest as well as the heading to the first point of interest.

The point of interest packet data unit may additionally comprise second data indicating a location of a second point of interest and the computer-readable code, when executed by the computing apparatus, may cause the computing apparatus to perform a method comprising, when emergency navigation is enabled, providing an output indicating a heading to the location of the second point of interest.

The computer-readable code, when executed by the computing apparatus, may cause the computing apparatus to perform a method comprising, when emergency navigation is enabled, providing an output indicating a range to the location of the second point of interest as well as the heading to the second point of interest.

The computer-readable code, when executed by the computing apparatus, may cause the computing apparatus to perform a method comprising ceasing providing the heading to the second location and starting to provide the heading to the first location upon determining that apparatus performing the method is located at the second emergency point of interest.

The computer-readable code, when executed by the computing apparatus, may cause the computing apparatus to perform a method comprising determining that the apparatus is located at the second emergency point of interest by determining that the apparatus is at a location that is at distance from the location of the second emergency point of interest that is less than a distance defined by range information decoded from the point of interest packet data unit.

Bluetooth Low Energy or BLE as used herein denotes Bluetooth Core Specification Version 4.0 or later versions that are backwards-compatible with Version 4.0. A BLE device or component is a device or component that is compatible with Bluetooth Core Specification Version 4.0.

BRIEF DESCRIPTION OF THE DRAWINGS

For a more complete understanding of example embodiments of the present invention, reference is now made to the following descriptions taken in connection with the accompanying drawings in which:

FIG. 7 presents a proximity octet indicating proximity with respect to a beacon.

DETAILED DESCRIPTION OF VARIOUS EMBODIMENTS

The following acronyms are used in the specification and have the meanings referred to
BLE: Bluetooth Low Energy
BT: Bluetooth
BT SIG: Bluetooth Special Interest Group
LE: Low Energy
RFU: Reserved for Future Use
HAIP: High Accuracy Indoor Positioning
POI: Point of interest
ePOI: Emergency point of interest BLE technology has been proposed to be used in high accuracy indoor positioning (HAIP) systems. HAIP with BLE uses an array of phased antennas to calculate angle-of-departure or angle-of-arrival of a signal. The principles behind calculating the angle-of-departure or angle-of-arrival are described in the prior art.

There are two main options for positioning a mobile device or beacon in a BLE HAIP system.

In a first option, the mobiles/tags transmit a BLE positioning packet, which is received at a base station (which can be called a locator) including an antenna array. The base station (or some other device) measures the angle-of-arrival (both azimuth and elevation angles) of the signal using samples of the positioning packet received at different elements of the antenna array, and consequently calculates the position of the mobile/tag. This can be called network-centric positioning. The network-centric approach is limited by capacity.

In a second option, a base station includes an antenna array and transmits a BLE positioning packet from different elements of the antenna array in a way that allows the mobile/tag to calculate the angle-of-departure (both azimuth and elevation angles) of the signal from the base station. The base station here can be termed a beacon. This can be termed mobile-centric positioning. The mobile-centric case is advantageous from the capacity point of view as any number of devices can measure and use broadcast signals for positioning purposes.

A base station or beacon may be able to operate according to both options.

It is the mobile-centric option that is of primary interest in the following, although of course a beacon may operate in the mobile-centric mode as well as the network-centric mode.

Figure 1:
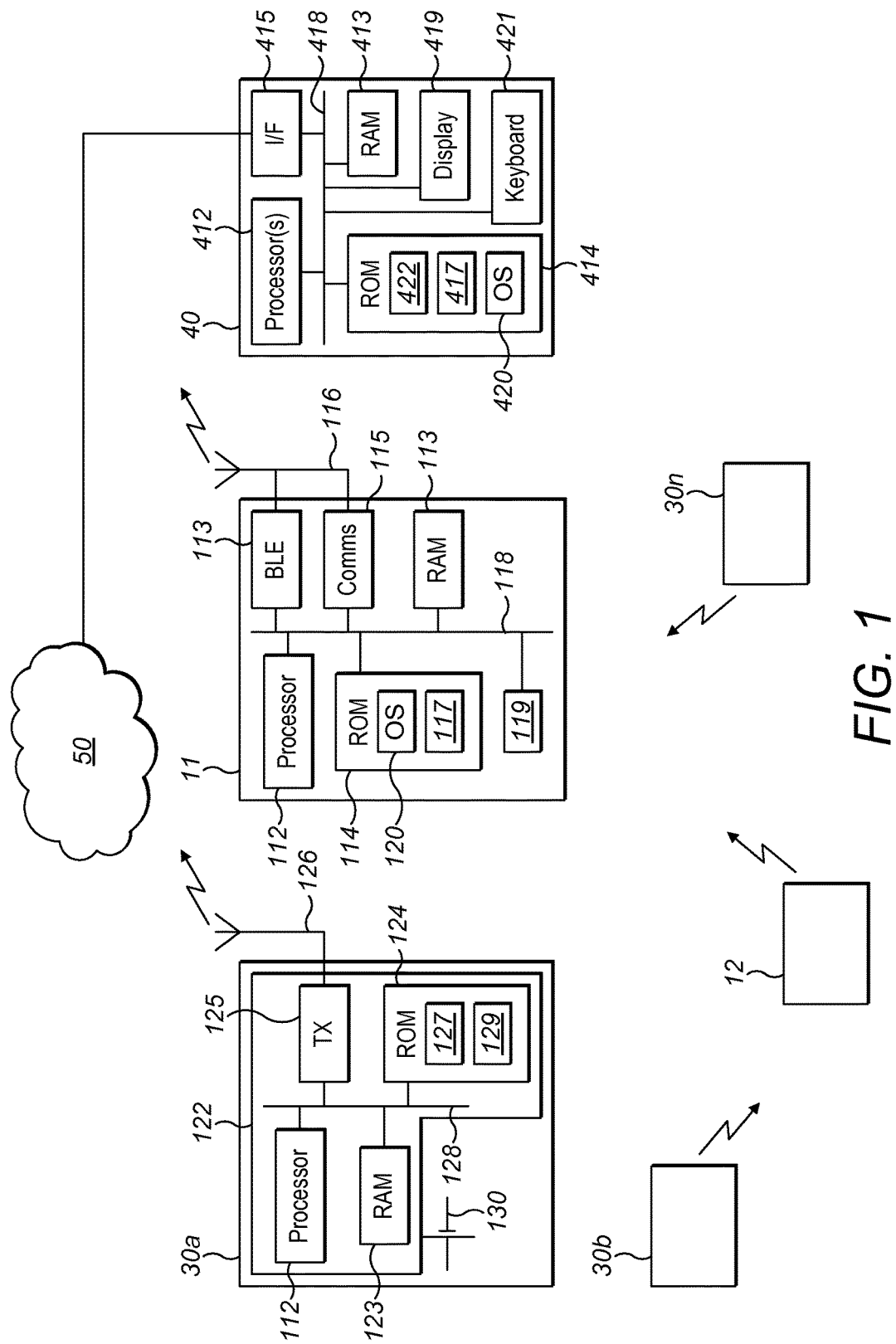
FIG. 1 is a schematic diagram of a system according to aspects of the invention including components according to aspects of the invention and operating according to aspects of the invention.

FIG. 1 shows a system according to embodiments of the invention. The system 10 includes a first device 11 and a second device 12. It also includes first to nth BLE beacons 30a, 30b to 30n, each of which may be referred to as a beacon 30. The system also includes a server 40. The first and second devices 11, 12 are mobile or portable and their locations can be tracked.

Briefly, the BLE beacons 30 are based at different locations within a building or complex of buildings and periodically transmit two different messages. These messages are, firstly, AoD positioning packets and, secondly, positioning advertisement messages. Both the AoD positioning messages and the positioning advertisement messages transmitted by a given beacon 30 include an identifier that is unique to that beacon 30 within the building.

Each of the BLE beacons 30 includes multiple antenna elements and transmits the AoD positioning packets including a certain packet tail called AoD extension. The beacon has multiple antenna elements which are used sequentially during the transmission of the AoD extension. The sequence of antenna elements involves switching between them in a pre-defined order. Each of the first and second devices 11, 12 is able to receive an AoD positioning packet from the BLE beacons 30 and calculate, from parameters of the received signal at the part corresponding to the AoD extension, a bearing from the beacon 30 at which the AoD positioning packet was received at the device 11, 12. The bearing is able to be calculated because of the form given to the signal transmitted along the bearing by the multiple antenna elements.

The positioning advertisement messages include information designating the location and orientation of the beacon 30. They may be sent from only a single element of the antenna 116. The positioning advertisement messages are received at the devices 11, 12.

Both AoD positioning packets and positioning advertisement messages are transmitted periodically, although the AoD positioning packets are transmitted more frequently.

The devices 11, 12 then can calculate their position using information designating the location and orientation of the beacon and the calculated bearing. Devices 11, 12 can calculate their locations having received an AoD positioning packet from one beacon with a reasonable degree of accuracy. Devices 11, 12 can calculate their locations with greater accuracy by triangulating information relating to AoD positioning packets received from two or more beacons, although the accuracy achieved using only one beacon typically is sufficient. Devices 11, 12 are able to calculate their location without network assistance.

The first device 11 includes a BLE module 13, which operates according to the BLE standard. Each of the BLE beacons 30 also includes a BLE module that operates according to the BLE standard.

The first device 11 includes a processor 112. The processor 112 is connected to volatile memory such as RAM 113 by a bus 118. The bus 118 also connects the processor 112 and the RAM 113 to non-volatile memory, such as ROM 114. A communications interface or module 115 is coupled to the bus 118, and thus also to the processor 112 and the memories 113, 114. A BLE module 13 is coupled to the bus 118, and thus also to the processor 112 and the memories 113, 114. An antenna 116 is coupled to the communications module 115 and the BLE module 13, although each may instead have its own antenna. Within the ROM 114 is stored a software application 117. The software application 117 in these embodiments is a navigation application, although it may take some other form. An operating system (OS) 120 also is stored in the ROM 114.

The first device 11 may take any suitable form. Generally speaking, the first device n may comprise processing circuitry 112, including one or more processors, and a storage device 114, 113, comprising a single memory unit or a plurality of memory units. The storage device 114, 113 may store computer program instructions that, when loaded into the processing circuitry 112, control the operation of the first device 11.

The BLE module 13 may take any suitable form. Generally speaking, the BLE module 13 of the first device 11 may comprise processing circuitry, including one or more processors, and a storage device comprising a single memory unit or a plurality of memory units. The storage device may store computer program instructions that, when loaded into the processing circuitry, control the operation of the BLE module 13.

The first device 11 also comprises a number of components which are indicated together at 119. These components 119 may include any suitable combination of a display, a user input interface, other communication interfaces (e.g. WiFi, etc.), a speaker, a microphone, and a camera. The components 119 may be arranged in any suitable way.

The BLE module 13 includes a communication stack that is implemented at least party in software using processor and memory resources (not shown), all of which are included within the BLE module 13. The BLE module 13 is configured, when enabled by the navigation application 117, to calculate the location of the host device 11 as described above, and to report the location to the navigation application 117.

The navigation application 117 is configured to control the BLE module 13 to switch between a positioning mode in which it calculates the position of the host device 11, 12 and a non-positioning mode in which it does not calculate the position of the host device 11, 12, as required by the navigation application 117.

The navigation application 117 may for instance control the BLE module to reside in the positioning mode when positioning has been enabled by the user or by the operating system 120 and when outdoor positioning (e.g. GPS) is unavailable, and to reside in the non-positioning mode otherwise. Alternatively, the navigation application 117 may for instance control the BLE module to reside in the positioning mode when positioning has been enabled by the user or by the operating system 120 and when BLE positioning advertisement messages have been received within a certain time period (e.g. 10 minutes before the current time), and to reside in the non-positioning mode otherwise.

The second device 12 may be configured and operate in the same way as the first device 11.

The devices 11, 12 may be mobile phones, smart phones, tablet computers, laptop computers, cameras, mp3-players, equipment integrated within vehicles, etc. The devices 11, 12 may be based around any suitable operating system, for instance the Symbian operating system or Microsoft Windows operating system, although any other operating system may instead be used. The devices 11, 12 may run different operating systems.

The beacon 30, for instance the first beacon 31a, includes a BLE module 121, an antenna 126 and a source of power 130. In the BLE module 121 of the beacon 30, a processor 122, RAM 123, ROM 124, a transmitter 125, software 127 and a bus 128 are constituted and connected in any suitable way. The ROM 124 of the beacon 30 also stores information 129. The information 129 includes an identifier that identifies the beacon, the location of the beacon, and the orientation of the beacon.

The beacon 30 includes a communication interface 108, using which communications can be received from the server 40. The server 40 may be connected either directly or indirectly with the beacon 30. The server 40 may be connected with the beacon 30 by Ethernet.

The source of power 130 may be for instance a power-over-Ethernet source, a battery, or mains power. The source of power 130 powers the BLE module 121 and any other components of the beacon 30.

The BLE module 121 of the beacon 30 may solely be a transmitter 125 and may not perform receiver functions. The transmitter 125 may include hardware needed for receiving, the receive function being disabled through the software 127. Alternatively, the transmitter 125 may be absent of some of the hardware needed for receiving. Put another way, it may be a transmitter or it may be a transceiver in which the receive functions have been disabled in software.

Each of the BLE beacons 30 includes multiple antenna elements (indicated together at 126 in the Figure) and transmits AoD positioning messages using these multiple antenna elements simultaneously. By transmitting the AoD positioning messages in this way, a device 11, 12 can calculate from parameters of the received signal that included the AoD positioning message an angle (actually, both azimuth and elevation angles) from the beacon 30 at which the device 11, 12 is located.

Each of the BLE beacons 30 also is configured to transmit information designating the location and orientation of the beacon 30. This information forms part of the positioning advertisement messages. As such, devices 11, 12 can calculate their locations having received an AoD positioning packet from one beacon 30 with a reasonable degree of accuracy. Devices 11, 12 can calculate their locations with greater accuracy by triangulating or by combining location information relating to AoD positioning message received from two or more beacons, although the accuracy achieved using only one beacon typically is sufficient. Devices 11, 12 are able to calculate their location without network assistance. Additionally, the beacons 30 do not need to receive communications from the devices 11, 12 in order to allow the devices 11, 12 to calculate their positions from the received AoD positioning message.

Positioning advertisement messages may be transmitted by each beacon 30 periodically, for instance at 1Hz (1 second intervals) or 2 Hz (0.5 second intervals) or at intervals defined by some component within the system. They may alternatively be transmitted on request of some component within the system.

AoD positioning messages may be transmitted by each beacon 30 periodically, for instance at 20 Hz (50 millisecond intervals). Clearly, devices 11, 12 can calculate their positions at the same periodicity, or the devices 11, 12 can filter multiple measurements for better accuracy. Such a frequency of transmission of AoD positioning messages allows rapid and reliable positioning updates for the devices 11, 12.

The beacon 30 may take any suitable form. Generally speaking, the beacon 30 may comprise processing circuitry, including one or more processors, and a storage device, comprising a single memory unit or a plurality of memory units. The storage device may store computer program instructions that, when loaded into the processing circuitry, control the operation of the beacon 30.

The other beacons 30b . . . 30n may be configured and operate in the same way as the first beacon 30a. The other beacons are different to the first beacon 30a at least in that the information 129 stored in the ROM 124 includes a different identifier and a different location, and may also include a different orientation of the beacon.

The server 40 includes a processor 412. The processor 412 is connected to volatile memory such as RAM 413 by a bus 418. The bus 418 also connects the processor 112 and the RAM 413 to non-volatile memory, such as ROM 414. A communications interface 415 is coupled to the bus 418, and thus also to the processor 412 and the memories 413, 414. The interface 415 is connected to the radio network 50 in any suitable way, for instance via the Internet or a local network. Within the ROM 414 is stored a software application 417. An operating system (OS) 420 also is stored in the ROM 414. Within the ROM 414 is also stored a location database 422.

An output device such as a display 419 may be provided with the server 40. An input device such as a keyboard 421 may be provided with the server 40.

The server 40 may take any suitable form. Generally speaking, the server 40 may comprise processing circuitry 412, including one or more processors, and a storage device 414, 413, comprising a single memory unit or a plurality of memory units. The storage device 414, 413 may store computer program instructions that, when loaded into the processing circuitry 412, control the operation of the server 40.

Some further details of components and features and alternatives for them will now be described.

The computer program instructions 117 may provide the logic and routines that enables the first device 11 to perform the functionality described below. The computer program instructions 117 may be pre-programmed into the first device ii. Alternatively, they may arrive at the first device 11 via an electromagnetic carrier signal or be copied from a physical entity such as a computer program product, a non-volatile electronic memory device (e.g. flash memory) or a record medium such as a CD-ROM or DVD. They may for instance be downloaded to the first device 11 from a server, for instance the server 40 but possibly another server such as a server of an application marketplace or store.

The processing circuitry 112, 122, 412 may be any type of processing circuitry. For example, the processing circuitry may be a programmable processor that interprets computer program instructions and processes data. The processing circuitry may include plural programmable processors. Alternatively, the processing circuitry may be, for example, programmable hardware with embedded firmware. The processing circuitry or processor 112, 122, 412 may be termed processing means.

Typically, the BLE modules 13, 121 each comprise a processor coupled connected to both volatile memory and non-volatile memory. The computer program is stored in the non-volatile memory and is executed by the processor using the volatile memory for temporary storage of data or data and instructions.

The term 'memory' when used in this specification is intended to relate primarily to memory comprising both non-volatile memory and volatile memory unless the context implies otherwise, although the term may also cover one or more volatile memories only, one or more non-volatile memories only, or one or more volatile memories and one or more non-volatile memories. Examples of volatile memory include RAM, DRAM, SDRAM etc. Examples of non-volatile memory include ROM, PROM, EEPROM, flash memory, optical storage, magnetic storage, etc.

Each BLE module 13, 121 may be a single integrated circuits. Each may alternatively be provided as a set of integrated circuits (i.e. a chipset). The BLE modules 13, 121 may alternatively be hardwired, application-specific integrated circuits (ASIC).

The communication interface 115 may be configured to allow two-way communication with external devices and/or networks. The communication interface may be configured to communicate wirelessly via one or more of several protocols such as Global System for Mobile Communications (GSM), Code Division Multiple Access (CDMA), Universal Mobile Telecommunications System (UMTS) and IEEE 802.11 (Wi-Fi). Alternatively or additionally, the communication interface 115 may be configured for wired communication with a device or network.

The apparatus 11, 12, 40, 30 may comprise further optional software components which are not described in this specification since they may not have direct interaction with the features described.

The BLE beacons 30 are distributed around a building or premises. For instance a first beacon 30a may be located in a canteen, a second beacon 30b may be located in a reception area, and so on. The first and second beacons 30a and 30b can be referred to as beacons 30. Beacons 30 do not need to provide complete coverage of a building, but advantageously are provided to provide good coverage of all key locations within the building.

The beacon identifier transmitted by a beacon 30 may be provided in a Device Address field or in a Device Identifier field of an advertising message, according to the BLE specification, or it may take some other form.

The latest version of the BLE specification defines three advertising channels, which serve for device discovery and other broadcasting purpose. To identify BLE devices, two important identifies—Device Address and Device Name—are highly relied upon. According to the BLE specification, packets sent in the advertising channels (index=37, 38 and 39) shall contain the device addresses, which are used to identify a BLE device. The identifier relating to a beacon may be a device address included in the Device Address field, or it may be included in a payload of the advertising message.

There are two types of device addresses: public device address and random device address, each of them is 48 bits in length. A device shall contain at least one type of device address and may contain both.

Public Device Address
The content of a public device address contains two fields:
company assigned field is in the 24 least significant bits
company_id field is in the 24 most significant bits
The public device address shall be created in accordance with section 9.2 ("48-bit universal LAN MAC addresses") of the IEEE 802-2001 standard (http://standards.ieee.org/getieee802/download/802-2001.pdf) and using a valid Organizationally Unique Identifier (OUI) obtained from the IEEE Registration Authority (see http://standards.ieee.org/reg-auth/oui/forms/ and sections 9 and 9.1 of the IEEE 802-2001 specification).
Random Device Address
A random device address is divided into the following two fields:
hash field is in the 24 least significant bits
random field is in the 24 most significant bits The detailed specification of the hash field and random field can be found in BT Specification v4.0, Vol. 3, Part C, Section 10.8.2.3 and Section 10.8.2.2, respectively.

On the other hand, the Generic Access Profile (GAP) also provides a Local Name AD Type to contain the device name in the BLE advertising data (BT Specification v4.0, Vol. 3, Part C, Section 11.1.2).

Figure 2A:
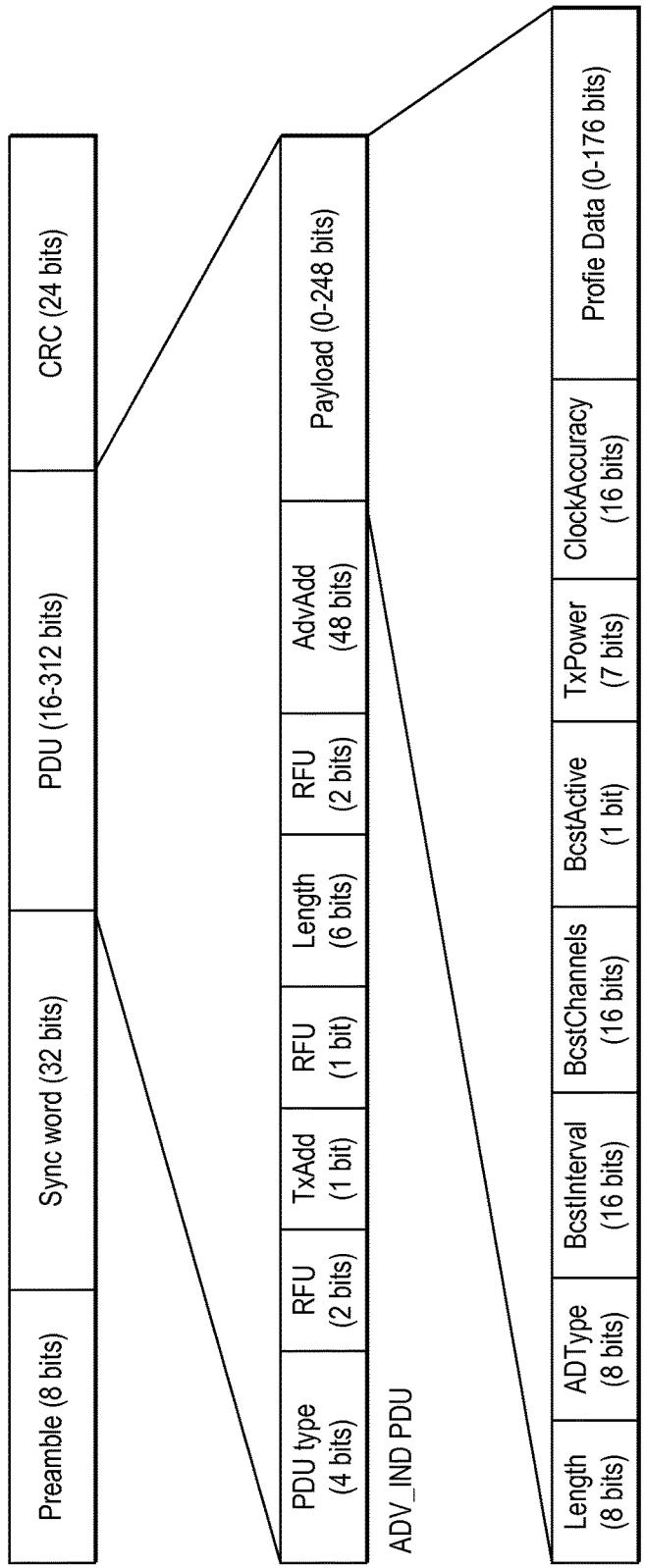
FIG. 2 presents the format of an Advertising Channel PDU used in embodiments of the invention.
Figure 2B:
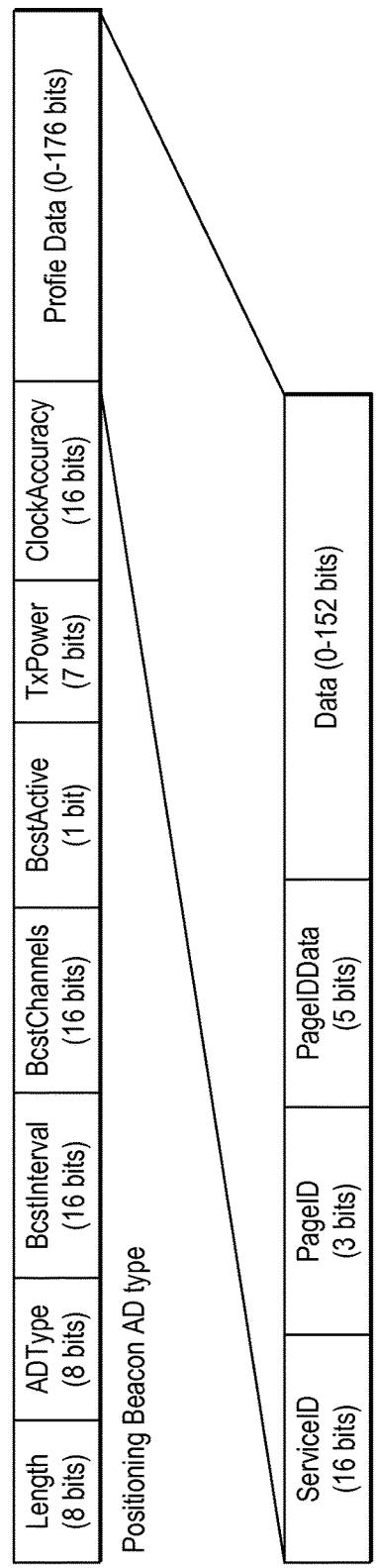

A positioning advertisement message may be a BLE link layer packet, an example of which is shown in FIG. 2. FIG. 2A shows higher level components of the positioning advertisement messages, and FIG. 2B shows some lower level components of the positioning advertisement messages.

As shown in FIG. 2, there are four main components to the message. The first part is a preamble. The second part is a sync word. The third part is a packet data unit (PDU). The fourth part is a cyclic redundancy check (CRC).

Here, the preamble is one octet (eight data bits, also known as one byte). The sync word is four octets. The PDU is between two and 39 octets. The CRC is three octets.

As shown in FIG. 2A, the PDU includes two main sections. The first is the header, and the second is the payload. The header here has 64 bits (six octets). The payload has a length that is between zero and 31 octets, as per the length field in the header part of the PDU.

The header is shown in FIG. 2A as being divided into six fields. The PDU type field comprises four bits, and identifies the type of the PDU. The second field is reserved for future use (RFU) and includes two bits. A TxAdd field is one bit. The fourth field is reserved for future use (RFU) and includes one bit. The Length field includes six bits. The sixth field is reserved for future use (RFU) and includes two bits. An AdvA field (or AdvAdd field) is 6 octets (48 bits).

The TxAdd field indicates whether the address of the beacon 30 in the AdvA field is public or random. The AdvA field includes the public or random address of the beacon 30.

The payload of the PDU, hereafter termed the Positioning Beacon AD Type, includes eight fields. The first of these is a length field, of one octet. The second is an AdType field which is one octet. The AdType field is used for structuring advertising data contents for different purposes. For example, the content may be a list of Service IDs, or just one service ID followed by the data related to that service ID. In these examples, there is a set of parameters that are known by the BLE module 113 of the receiver.

A BestInterval field is two octets long. This indicates the interval between successive Broadcasts. A BestChannels field is two octets long. This indicates the channels that are used for broadcast. A BestActive field is one bit long. This bit indicates whether broadcasting is active. A Transmit-Power field is seven bits long. The transmit power is indicated in this field. A ClockAccuracy field is sixteen bits long. This includes data that indicates the accuracy of the clock within the beacon 30. Lastly, a Profile Data field is between 0 and 22 octets long, according to the value included in the Length field.

The Positioning Beacon AD Type is shown both FIGS. 2A and 2B, but this is the same in both Figures. FIG. 2B shows in detail the Profile Data field of the Positioning Beacon AD Type.

The Profile Data field of the Positioning Beacon AD Type includes four fields. The first is ServiceID, which is two octets in length. The data included in the ServiceID field is used only by the Host of the BT communications stack. An identifier of the service that is provided by the positioning messages is included in this field. A PageID field is three bits. An ePOI/non-ePOI indicator field is five bits long.

Lastly, a Data field is between 0 and 19 octets, according to the data included in the Length field of the Positioning Beacon AD Type.

Briefly, embodiments of the invention provide emergency navigation within a positioning system. Features of the embodiments can make it possible to provide this without any network connectivity for mobile devices, whilst having low power consumption. In brief, a beacon transmits emergency exit location data along with angle-of-departure positioning messages. A receiver receiving those messages can determine its position and provide a heading to an emergency point of interest (ePOI) such as an exit or a location on a route to an exit. The ePOI is defined by the data broadcast from the beacon with respect to a location within the range of the beacon. The mobile device may also provide an indication of a distance from the mobile device to the ePOI, based on data received from the beacon. A proximity data positioning message transmitted by the beacon may indicate multiple ePOIs. In the specific examples, a proximity data positioning message indicates up to five ePOIs within the range of the beacon.

Figure 3:
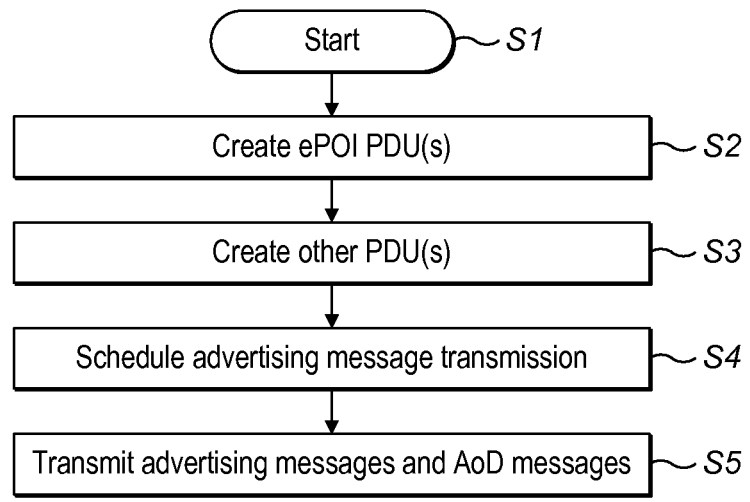
FIG. 3 is a flow chart illustrating operation of a beacon of FIG. 1 according to embodiments of the invention.

Embodiments will now be described, starting with reference to FIG. 3. FIG. 3 is a flowchart illustrating operation of a beacon 30 according to the invention.

The operation starts at step S1. At step S2, one or more point of interest (POI) PDUs are created. Each POI PDU defines one or more ePOIs. Each ePOI is defined by a centre for the ePOI and a range from the centre of the ePOI, although in some embodiments the range may be omitted. Where multiple ePOIs are signalled in an POI PDU, each ePOI may have a different range. The POI PDU contains data indicating the locations of the centres of the ePOIs.

In the following, an ePOI is an area which is formed by a circle drawn around a location with a radial equal to the range. As such, an ePOI is defined by a location, which is at the centre of the ePOI, and a range. In the following, references to a device being within the ePOI refer to a device being within the area defined by the centre of the ePOI and the range, and the converse is true for a device being outside the ePOI. In relation to a heading to an ePOI, the heading is provided to the centre of the ePOI. However, it will be appreciated that alternatively range data may not be provided, in which case the ePOI is in effect a single position.

At step S3, one or more other PDUs are created. These other PDUs relate to other aspects of the system. The other PDUs include PDUs that indicate the location of the beacon 30. A PDU indicating the location of a beacon can be termed an antenna coordinate PDU, on the basis that it includes the coordinates of the antenna from which the AoD positioning messages are transmitted. The other PDUs may also include POI PDUs that relate to non-emergency POIs. The other PDUs may also include proximity data PDUs including coded text that relates to the non-emergency POIs. The proximity data PDUs also indicate to which POIs the proximity data relates.

At step S4, the beacon 30 schedules transmission of advertising messages. Each of the POI PDUs and the other PDUs are included in a respective, separate advertising message.

The schedule may be created such that antenna coordinates, relating to the location of the beacon 30, are transmitted relatively frequently by the beacon 30. A desirable effect of this is to minimise the maximum time to first fix, which is the longest period of time that a mobile device 11, 12 could need to obtain the information it needs from signals transmitted from the beacon 30 in order to calculate the position of the mobile device 11, 12. For instance, the antenna coordinates may be transmitted every other slot, that is in slots 1, 3, 5 etc.

Interleaved between the antenna coordinate slots are slots in which positioning advertisement messages containing POI PDUs and other PDUs are transmitted. The schedule is created by the beacon 30 such as to transmit all the POI PDUs and other PDUs once each in a sequence, before repeating the sequence.

Scheduling the advertising messages in this way allows the POI PDUs and other PDUs to be transmitted in such a way that the maximum time to fix a location is not reduced significantly compared to the situation in which the antenna coordinates are transmitted at every slot in the sequence. It will be appreciated that the antenna coordinates are given higher priority than the POI PDUs and other PDUs in the sequence, which in most cases is likely to be appropriate because in most instances the mobile devices 11, 12 and the users will be more interested in knowing their location quickly than in having information about ePOIs and non-ePOIs quickly.

The beacon 30 may be configured to schedule the positioning advertising messages such that the antenna coordinates are provided in a first coordinate frame, for instance a global coordinate frame, in slots 1, 5, 9 etc. and in a second coordinate frame, for instance a local coordinate frame, in slots 3, 7, etc. Providing PDUs for the antenna coordinates in different coordinate frames increases the likelihood that a mobile device 11, 12 will receive the antenna coordinates in a form that is usable, or more easily usable, by that device 11, 12.

After the schedule has been created, at step S5 the beacon 30 transmits the positioning advertising messages and the AoD messages. Here, the advertising messages are transmitted according to the schedule as created at step S4. The AoD messages are transmitted separately. The advertising messages may be transmitted on a different periodicity to the AoD messages. For instance, the advertising messages can be transmitted once per second, so at a frequency of 1 Hz. The AoD messages may be transmitted more frequently, for instance at 50 millisecond intervals, i.e. at 20 Hz.

The frequency of transmission of AoD messages dictates the intervals between successive position fixes for mobile devices. The interval between successive advertising messages dictates the maximum time to a mobile device obtaining antenna coordinates relating to a location of a beacon 30. It also dictates, along with the number of advertising messages included in the schedule, a maximum time to the mobile device 11 receiving all of the advertising messages that are transmitted by the beacon 30.

An example form for an POI PDU is shown in the table below. This part of the POI PDU is the part that is included in the Data field of the PDU shown in FIGS. 2A and 2B.

| #Octet | Type | Service | Comments |
|---|---|---|---|
| 0 | Service ID | — | Fixed |
| 1 | Service ID | — | Fixed |
| 2 | \| Page ID \| ePOI/non-ePOI indicators \| | — | Fixed/reserved |
| 3 | \| exit/entry \| heading \| range \| | Proximity_1 wrt beacon | Resolution: 0.50 m, max range 32 m |
| 4 | \| exit/entry \| heading \| range \| | Proximity_2 wrt beacon | Resolution: 0.50 m, max range 32 m |
| 5 | \| exit/entry \| heading \| range \| | Proximity wrt ePOI_1 | Resolution: 0.50 m, max range 32 m |

-continued

| #Octet | Type | Service | Comments |
|---|---|---|---|
| 6 | POI_ΔEast | Proximity wrt ePOI_1 | Resolution 0.50 m, range: [−64, 64] m |
| 7 | POI_ΔNorth | Proximity wrt ePOI_1 | Resolution 0.50 m, range: [−64, 64] m |
| 8 | \| exit/entry \| heading \| range \| | Proximity wrt ePOI_2 | Resolution: 0.50 m, max range 32 m |
| 9 | POI_ΔEast | Proximity wrt ePOI_2 | Resolution 0.50 m, range: [−64, 64] m |
| 10 | POI_ΔNorth | Proximity wrt ePOI_2 | Resolution 0.50 m, range: [−64, 64] m |
| 11 | \| exit/entry \| heading \| range \| | Proximity wrt ePOI_3 | Resolution: 0.50 m, max range 32 m |
| 12 | POI_ΔEast | Proximity wrt ePOI_3 | Resolution 0.50 m, range: [−64, 64] m |
| 13 | POI_ΔNorth | Proximity wrt ePOI_3 | Resolution 0.50 m, range: [−64, 64] m |
| 14 | \| exit/entry \| heading \| range \| | Proximity wrt ePOI_4 | Resolution: 0.50 m, max range 32 m |
| 15 | POI_ΔEast | Proximity wrt ePOI_4 | Resolution 0.50 m, range: [−64, 64] m |
| 16 | POI_ΔNorth | Proximity wrt ePOI_4 | Resolution 0.50 m, range: [−64, 64] m |
| 17 | \| exit/entry \| heading \| range \| | Proximity wrt ePOI_5 | Resolution: 0.50 m, max range 32 m |
| 18 | POI_ΔEast | Proximity wrt ePOI_5 | Resolution 0.50 m, range: [−64, 64] m |
| 19 | POI_ΔNorth | Proximity wrt ePOI_5 | Resolution 0.50 m, range: [−64, 64] m |

This PDU includes twenty octets of data, labelled from octet number 0 to octet number 19. Octet numbers 0 and 1 are reserved for the Service ID field. Octet number 2 includes the Page ID field and the ePOI/non-ePOI indicator field. Octet numbers 3 to 18 define POIs, some of which may or may not be ePOIs and some of which cannot be ePOIs.

In particular, proximity octet numbers 3 and 4 each define a non-emergency POI with a centre that is co-located with the beacon 30.

For POIs, including ePOIs, that are not co-located with the beacon 30, three octets are used to define the POI. A first POI is defined by octet numbers 5 to 8. A second POI is defined with respect to octet numbers 8 to 10. A third is defined with respect to octet numbers 11 to 13. A fourth is defined with respect to octets 14 to 16. A fifth is defined with respect to octet numbers 17 to 19.

The data is different for ePOIs than it is for non-ePOIs. Non-ePOIs will be described first.

A basic POI definition includes information identifying a range to a centre of a POI, as discussed above. It also includes information identifying whether a notification is to be triggered upon entry to the POI or upon exit from the POI.

A proximity octet indicating proximity with respect to the beacon 30, such as either of proximity octet numbers 3 and 4, is shown in FIG. 7. This can be termed a proximity octet.

In FIG. 7, it can be seen that bit o is given over to an Entry/Exit field. Bit 1 is given over to a Heading field. Bits 2 to 7 are given over to a Range field.

The value of the data in the entry/exit field is an indication as to whether a notification is to be provided when the receiving mobile device moves from outside to within the POI or whether a notification is to be provided when the device moves from inside without the POI. For instance, a value of 1 can indicate triggering a notification on exit from the POI, and a value of o can indicate triggering a notification on entry to the POI.

Data in the Heading field indicates whether heading and range information is to be provided in respect of the POI. If a heading is not to be provided, then a mobile device 11 takes no action to display a heading to an POI. If data included in the Heading field indicates that a heading is to be required, a mobile device 11 may respond to this data by providing a heading to the centre of the POI, and may also indicate the range to the POI in terms of the distance between the mobile device 11 and the centre of the POI.

Data in the Range field indicate the radius of a circle originating at the centre of the POI. By having six bits, the range may take one of 64 different values. The range may be specified by the data in the Range field in any suitable way. For instance, the unit of 1 may indicate a distance of 0.5 meters, which defines the resolution of the range measurement.

In combination, the proximity octet shown in FIG. 7 indicates to a mobile device 11 a range from a location (which is the centre of the POI, for instance the two dimensional location of the beacon 30), whether a notification is to be triggered upon entry to or exit from the POI, and whether a heading (and optionally range) is to be notified in respect of the POI.

With non-ePOIs, a notification can be triggered when a user of a mobile device ii enters the POI defined by the first proximity range. This notification is caused by the beacon 30 providing the proximity octet, for instance octet number 3 or octet number 4, with a value 0 in the Entry/Exit field, indicating that a notification is triggered on entry to the ePOI, and including data in the Range field indicating the first proximity range. In this example, what is included in the Heading field is not used at this time. If the data in the Entry/Exit field has a value of 1, indicating that a trigger is required upon exit from the ePOI, behaviour is different. Instead, a notification is triggered when the user of the mobile device 11 moves from within a distance of the beacon 30 set by the second proximity range to a location that is greater than the second proximity range from the beacon 30.

As such, a geofence is set by a proximity octet in the POI PDU that defines a non-ePOI. The same proximity octet also indicates whether a notification is to be triggered upon entry to or exit from the POI. The radius/diameter of the geofence is set by data included in the Range field of the proximity octet of the POI PDU. As such, a relatively highly configurable geofence is set up using only one octet of data in an POI PDU transmitted by the beacon 30.

The ePOI/non-ePOI indicator field indicates which of the POIs that are defined in octet numbers 3 to 19 are ePOIs and which are non-ePOIs. One bit of the ePOI/non-ePOI indicator field is used for each POI. The MSB of the ePOI/non-ePOI indicator field relates to the first POI, the next bit relates to the second POI, etc. A value of 1 indicates an ePOI and a value of o indicates a non-ePOI.

In the examples given above, relating to proximity octet numbers 3 and 4 in the POI PDU, the centre of the POI is the (two-dimensional) location of the beacon 30. With other POIs defined in the POI PDU, the centre of the POI has some different location. This will now be described referring to the POIs as ePOIs, although whether a POI is an ePOI or a non-ePOI depends on the value of the corresponding bit in the ePOI/non-ePOI indicator field.

Referring to ePOI number 1 (ePOI_1 in the table), defined with reference to octet numbers 5 to 7, for instance, there are additional fields that define the centre of the ePOI. In particular, a first octet, in this instance octet number 5, is a proximity octet, and includes an Exit/Entry field. It also includes a Range field. It also includes a Heading field. In this example, the first, proximity octet has the same format as the proximity octet shown in FIG. 7, as is included as one of proximity octet numbers 3 and 4. The above description of the Range field and the meaning of data included in the Range field of proximity octet 3 applies also to ePOI_1, and is not repeated here. In an ePOI, however, the Entry/exit and Heading fields are not used, so the data that is included in these fields does not affect receiver operation.

Additionally to range, the centre of ePOI_1 is defined. In this example, the centre of ePOI_1 is defined relative to the position of the beacon 30. In other examples, it may be defined as an absolute position, for instance using a global coordinate frame. Continuing with the local coordinate frame example, octet number 6 includes data that indicates a distance of the centre of ePOI_1 from the location of the beacon in one dimension and octet number 7 indicates a distance from the centre of ePOI_1 to the beacon 30 in another dimension. Here, octet number 6 relates to a distance in the East direction, and can take a negative or positive value. Similarly, the data in octet number 7 indicates a distance in the North direction, and can take a positive or negative value. In this example, the East and North distances are defined with a resolution of 0.5 meters. The use of 8 bits allows a maximum range of −64 to +64 meters (128 meters in total) to be defined.

In this way, a first ePOI can be defined within a range of the beacon 30, for instance centred in a positive direction East of the beacon and in a negative direction North.

In the proximity octets, the data in the Range field may never have a value of zero, which would relate to a range of zero meters. Instead, a range of zero meters has a special purpose indicating that the proximity service is not enabled for the particular ePOI. As such, the smallest range is one unit, which depends on the resolution in which the range is defined. In this example, the smallest range is 0.5 meters.

The provision of ePOIs that are not centred on the location of the beacon allows target locations to be defined at specific locations or areas. For instance, it makes it possible to define a target location at an exit to a building, and to define other target locations at positions on a route to the exit. Because the POI PDU can define multiple ePOIs that are not centred on the beacon, a single beacon can provide for multiple target locations to be defined.

The sizes of the ePOIs, as defined by the range from the centre location of the ePOI, may be different for each of the ePOIs.

By using the form of the POI PDU shown in the table above, up to five different ePOIs can be defined within a single positioning advertisement message.

For non-ePOIs, Heading and Entry/exit data is used. The first octet, in this instance octet number 5, is a proximity octet, and includes an Exit/Entry field. It also includes a Range field. It also includes a Heading field. In this example, the first, proximity octet has the same format as the proximity octet shown in FIG. 7, as is included as one of proximity octet numbers 3 and 4. The above description of the fields and the meaning of data included in the fields of proximity octet 3 applies also to ePOI_1, and is not repeated here.

A first non-ePOI may be centred in a negative direction East of the beacon and in a positive direction North. The data in the Entry/Exit field of the data relating to the first POI indicates that a notification is to be triggered upon entry into the first POI. As such, when a user of a mobile device 11 moves into the first POI, as defined by the location at the centre of the POI and the proximity range of the POI, a notification may be triggered. If the data in the heading bit relating to the first POI indicates that heading information is to be provided, the heading notification may be provided whenever the mobile device 11 is within range of the beacon 30. An additional notification may occur when the mobile device 11 enters or exits the POI, depending on the information included in the proximity octet of the PDU relating to the POI.

The provision of POIs that are not centred on the location of the beacon allows notifications to be triggered at specific locations or areas. For instance, it makes it possible to define that a notification will be triggered when a certain part of an aisle in a retail outlet or a certain booth in a conference hall is exited or entered. Moreover, the conditions for triggering each of the non-ePOIs may be different. Furthermore, the sizes of the non-ePOIs, as defined by the range from the centre location of the POI, may be different for each of the POIs. Additionally, a separate heading requirement may be defined for each of the POIs. By using the form of the POI PDU shown in the table above, seven different non-ePOIs can be defined, two of them centred on the location of the beacon 30 and five of them centred on other locations, within a single positioning advertisement message.

The beacon 30 provides the POI PDU with ePOIs in a particular order. In particular, the ePOIs that relate to locations that are closest to the exit are placed highest up the list. The first POI relates to a location that is at the exit, or at least is the location within the range of the beacon 30 that is closest to the exit. This allows mobile devices 11, 12 that have received the POI PDU to use the data included to navigate to the exit.

The beacon 30 also provides the POI PDU with ePOIs that have suitable ranges. The range of an ePOI corresponding to an exit may be relatively small. The range of an ePOI corresponding to an open area on a route to an exit may be relatively large.

The beacon 30 may be configured with POI data and/or proximity data for broadcast in any suitable way.

For instance, the beacon 30 may be configured with POI data and proximity data by the server 40, for instance through an Ethernet connection. This provides a particularly flexible solution. It also allows the POIs to be reconfigured or modified during the business day, for instance to direct users to different parts of a retail outlet at lunchtimes versus afternoons.

It may alternatively be configured to create PDUs with POI data and proximity data provided by an operator connected to the beacon 30 through a portable device, such as a tablet computer or some other portable device 11. Access may be through a secured wireless connection. Access may be dependent on operator authentication, for instance by requiring a password. Configuration may occur through the device 11 being provided with a configuration software application or through a web interface, for instance. The software or web interface may provide a visual indication of the floor plan of the premises and the location of the beacon. The software or web interface allows the operator to set up POIs and provide information such as range, heading, type, messages etc. for storage in the beacon 30. The POI configuration of the beacon 30 may change periodically or occasionally as needed.

Operation of the mobile device 11 in handling the above-described PDUs will now be described with reference to FIGS. 4 and 5.

Figure 4:
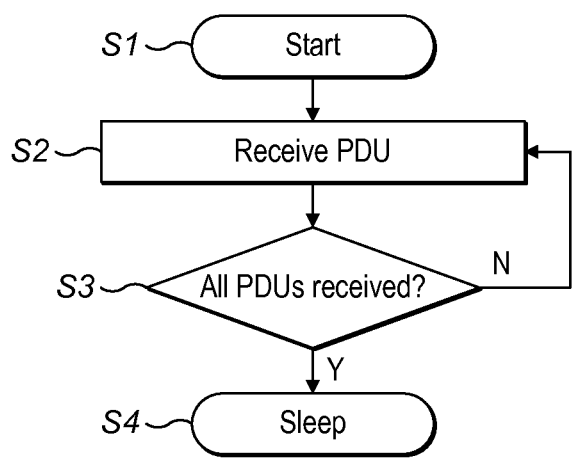
FIGS. 4 and 5 are flow charts illustrating operation of a mobile device of FIG. 1 according to embodiments of the invention.

At step S1 of FIG. 4, the operation starts. At step S2, a PDU is received. At step S3 it is determined whether all of the PDUs in the sequence transmitted by the beacon 30 have been received. If they have not been received, the operation returns to step S2. Once all PDUs have been determined to have been received, the operation ends at step S4. Here, the mobile device 11 goes into a partial sleep, at least in the sense that it does not receive any further positioning advertising messages from the beacon 30.

If the mobile device 11 detects the presence of a different beacon 30, the operation of FIG. 4 is performed also in respect of the new beacon. PDUs from the old beacon may be retained only until the mobile device 11 moves out of range of the beacon 30, or may be retained for an additional further period (for instance 12 hours).

The operation of FIG. 4 can run in parallel with other operations in the mobile device 11.

An effect of the operation of FIG. 4 is to ensure that all of the unique PDUs transmitted by a beacon 30 have been received by the mobile device. If there are multiple beacons 30 in range, PDUs from all beacons are ensured to have been received.

Figure 5:
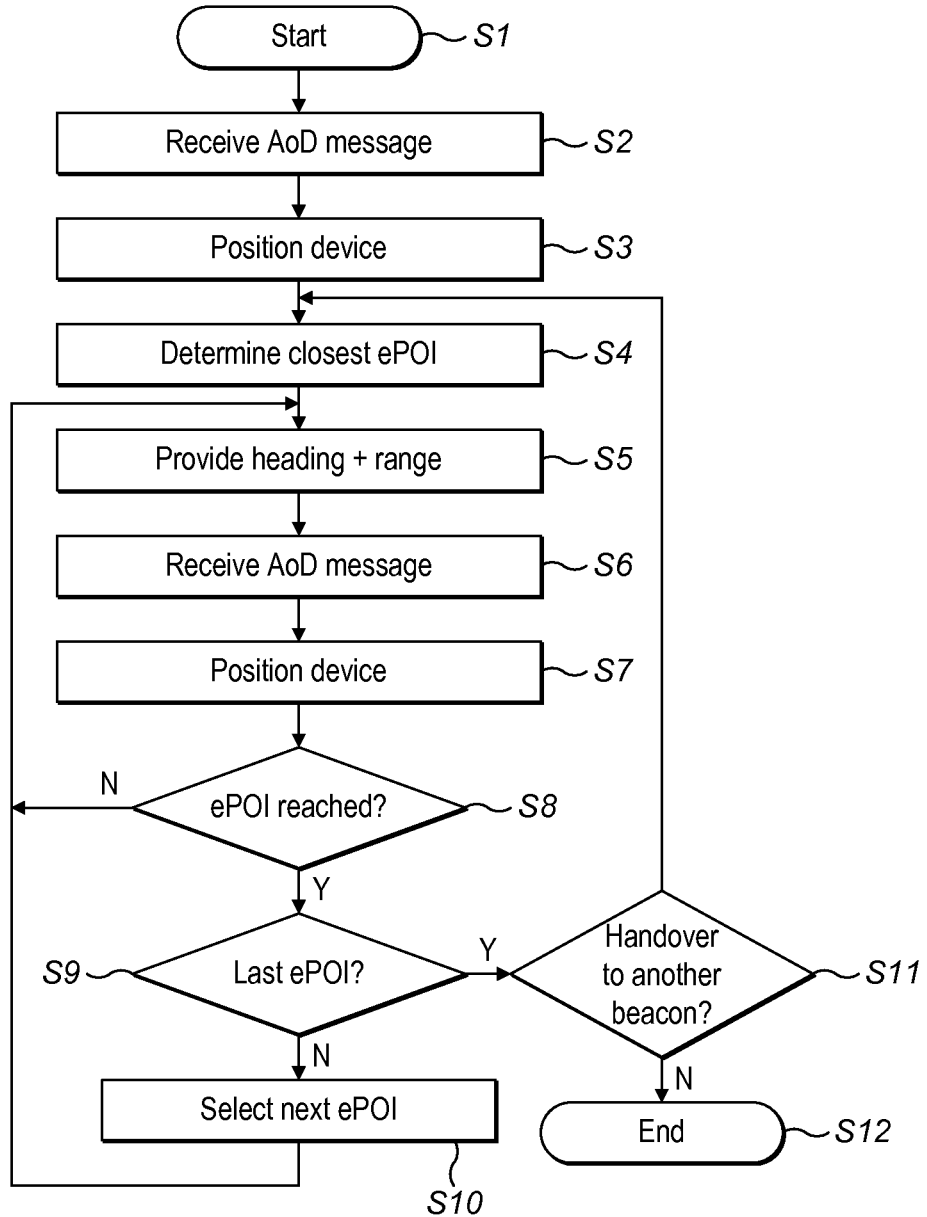

The operation of FIG. 5 is performed by the mobile device in parallel with the operation of FIG. 4. The operation of FIG. 5 is started when the device 11 enters emergency navigation mode. This can be initiated by the user of the device 11 providing a suitable user input. Alternatively, it may occur in response to the mobile device n receiving an emergency message from the beacon 30. Entering into the emergency navigation mode may involve the navigation application 117. It is the navigation application 117 that may provide instructions to the user as to how to reach an exit based on information received in a POI PDU received from the beacon 30.

The operation starts at step S1. At step S2, an AoD positioning message is received. At step S3, the device 11 determines its position using the received AoD positioning message.

At step S4, the mobile device 11 determines the closest ePOI to the current location. This may involve simply calculating a straight line distance from the current location to each of the ePOI locations and identifying the ePOI with which the shortest distance is associated. If two or more POIs are approximately equally close to the mobile device 11, the device 11 selects the ePOI that has the higher rank, in the sense that it is closer to the start (top, as shown) of the POI PDU.

At step S5, the mobile device 11 provides the heading and range to the closest ePOI. The heading may be provided as a bearing with respect to magnetic North, for instance.

At step S6, another AoD positioning message is received. At step S3, the device 11 again determines its position, this time using the latest received AoD positioning message.

At step S8, the mobile device 11 determines whether an ePOI has been reached. This involves determining whether the position of the mobile device 11 is at a distance from the ePOI that is less than the range specified in the Range field for that ePOI. As such, the mobile device does not need to be at the exact location of the ePOI, but need only be within a distance that is specified in connection with the POI.

In an ePOI has not been reached, the operation returns to step S5. Steps S5 to S8 are repeated until an ePOI is reached. It is worth noting that this need not be the closest ePOI that was determined at step S4.

Once an ePOI is reached, it is determined at step S9 whether it is the last ePOI that has been reached. The last ePOI is the one that relates to the exit or as close to the exit as is within range of the beacon 30. As such, this is the first ePOI in the POI PDU, as described above. If it is not the last ePOI that has been reached, at step S10 the next ePOI is selected and the operation returns to step S5, where a heading and range are provided for the new ePOI. The ePOI that is selected is the one that is next highest up the list of ePOIs, which relates to a location that is next closest to the exit of the building.

Once the last ePOI is reached, the mobile device 11 determines at step S11 whether to hand over emergency navigation to use ePOIs from a different beacon. This may be performed in any suitable way. If the mobile device 11 at this time is unable to receive messages from any other beacon 30, then a negative determination results. If the mobile device 11 determines that the only other beacon 30 from which messages can be received also has a first ePOI relating to the current location of the mobile device them a negative determination results. If the mobile device 11 determines that one or more other beacons 30 from which messages can be received have first ePOIs relating to locations that are not close to the current location of the mobile device 11, then a positive determination results. On a positive determination, the operation proceeds to step S4, where the closest ePOI for the new beacon 30 is determined.

The operations described above with reference to FIGS. 4 and 5 are performed within the BLE module 113 of the device 11. That is, all of the steps of the method are effected by the BLE stack and BLE controller within the BLE module 113. Notifications as to heading and bearing that are provided by the BLE module 113 are received at the navigation application 117, which uses the notifications to make any needed interactions with the user. The notifications provided by the BLE module 113 to the navigation application 117 may take any suitable form. In other embodiments, some or all of the steps of the operations of FIGS. 4 and 5 are performed externally of the BLE module 113 within the device 11, for instance by the application 117. In these other embodiments, PDUs are passed from the BLE module 113 to the application 117 as they are received from the beacon 30, and are then processed by the application 117.

An example implementation or deployment will now be described with reference to FIG. 6.

In this example, first to third beacons 30*a,* 30*b* and 30*c* are located at different locations within a building. Each of the beacons 30 has a respective range, illustrated by a circle centred on the beacon location. An exit is shown at the lower left corner of the building. Paths and corridors are defined between barriers including offices, walls etc. in the building. The barriers are shown as solid lines or hatched areas, and the paths and corridors are not hatched. A number of ePOIs are defined by each beacon 30. Each beacon 30 transmits one or more POI PDUs that define the relevant ePOIs.

Associated with the first beacon 30*a* are two ePOIs. The first is labelled ePOI_1_A and the second is labelled ePOI_2_A. The first is closest to the exit, in fact it is at the exit. Associated with the second beacon 30*b* are two ePOIs. The first is labelled ePOI_1_B and the second is labelled ePOI_2_B. The first is closest to the exit, in fact it is within the range of the first beacon 30*a*. Associated with the third beacon 30 are two ePOIs. The first is labelled ePOI_1_C and the second is labelled ePOI_2_C. The first is closest to the exit.

Except for the ePOI that is at the exit, the ePOIs are centred at a centre point of a corner or junction in a corridor or path. Each of these ePOIs has a range that means that it occupies the whole width of the corridor or junction. The range is not so large that it extends significantly more than the width, though. By locating the ePOIs in this way and giving them such a range, a mobile device 11 can be assured to pass into the ePOI when travelling along the relevant corridor to the exit.

The ePOI that is at the exit has a relatively small range and is located at the exit. This helps to guide users to the actual exit, rather than to a location near to the exit.

As discussed above, mobile devices 11 operate to receive all PDUs transmitted by a beacon whose range they are within. Upon a mobile device 11 entering emergency navigation mode, the device 11 identifies the closest ePOI and provides a heading and range to the ePOI. If the device 11 includes a compass function, this may be provided in terms of an arrow and a range on a display. The user can then follow the heading towards the ePOI. Upon reaching the ePOI, the device 11 provides a heading (and range) to the ePOI that is next higher ranked in the range of the same beacon 30 or, if there is no higher ranked ePOI, an ePOI from another beacon (if available). These features together with the placement of the ePOIs provide a scheme whereby a mobile device 11 is guided towards the exit, potentially through a long series of ePOIs provided by multiple beacons 30.

Figure 6:
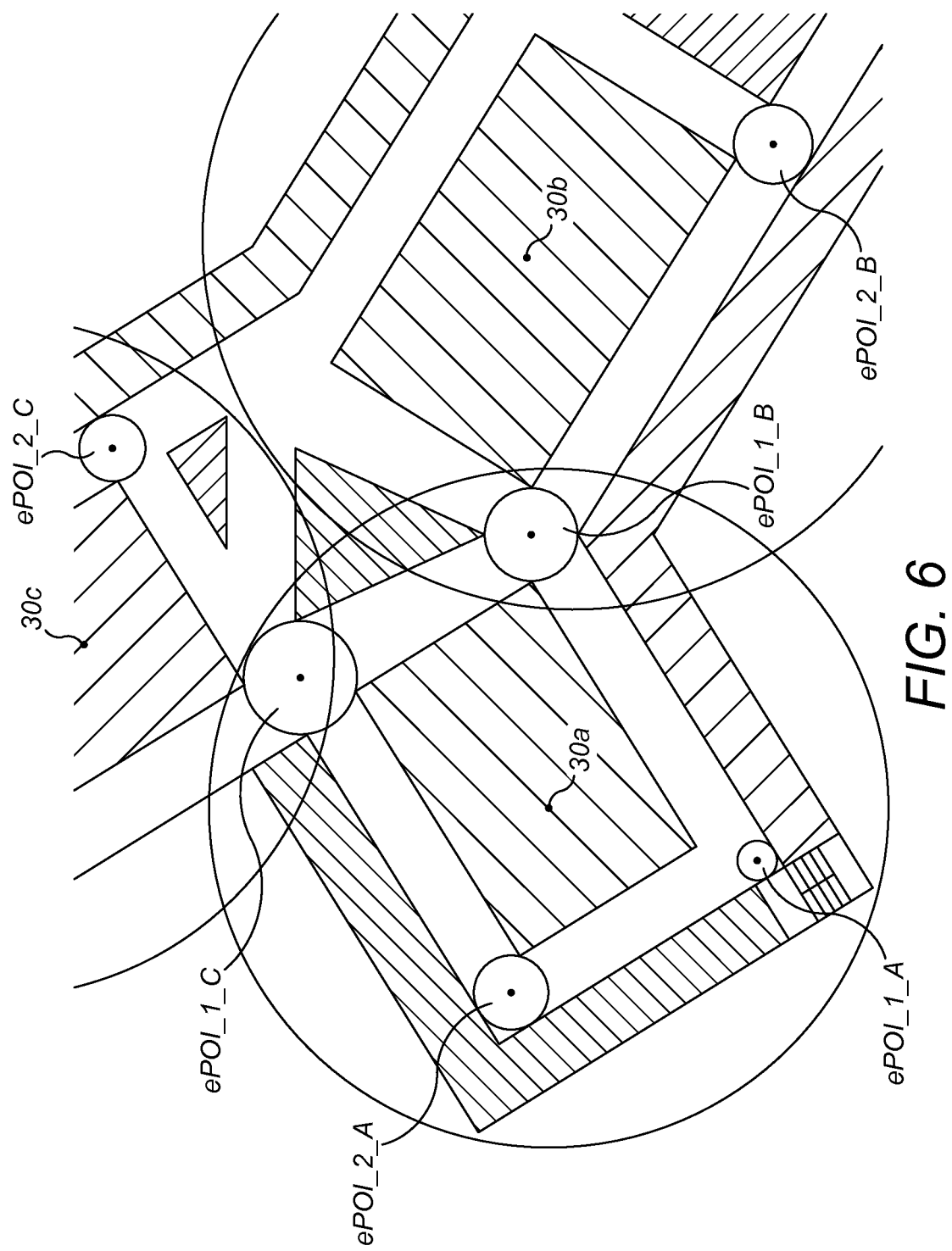
FIG. 6 is a schematic diagram illustrating one implementation of a system including a beacon and a mobile device of FIG. 1

In the example shown in FIG. 6, a mobile device 11 located on the right side of the Figure will, by the features described above, be provided initially with a heading and range either to ePOI_1_B or to ePOI_2_B. If the device 11 is guided initially to ePOI_2_B, upon reaching that ePOI the device 11 acts to provide guidance then to ePOI_1_B. Either way, the device 11 is guided to ePOI_1_B. Upon reaching ePOI_1_B, the device 11 acts to hand over to the first beacon 30a. Upon handover, the device 11 is provided with a heading and range to ePOI_1_A, which is the location of the exit.

In the example shown in FIG. 6, a mobile device 11 located on the top of the Figure will, by the features described above, be provided initially with a heading and range either to ePOI_1_C or to ePOI_2_C. If the device 11 is guided initially to ePOI_2_C, upon reaching that ePOI the device 11 acts to provide guidance then to ePOI_1_C. Either way, the device 11 is guided to ePOI_1_C. Upon reaching ePOI_1_C, the device 11 acts to hand over to the first beacon 30a. Upon handover, the device 11 is provided with a heading and range to ePOI_2_A (which is closer than ePOI_1_A to ePOI_1_C), from where the device 11 is provided with a heading and range to ePOI_1_A, which is the location of the exit.

In the example shown in FIG. 6, a mobile device 11 located on the lower left side of the Figure will, by the features described above, be provided initially with a heading and range either to ePOI_1_A or to ePOI_2_A. If the device 11 is guided initially to ePOI_2_A, upon reaching that ePOI the device 11 acts to provide guidance then to ePOI_1_A. Either way, the device 11 is guided to ePOI_1_A, which is the location of the exit.

The features of the system prevent a device 11 being given instructions to bounce back and forth between two ePOIs. They may not provide the shortest route to the exit in every situation (consider for instance the situation where a device is between ePOI_1_B and ePOI_1_A but in the range of both beacons; they may first be directed to ePOI_1_B), but through careful selection of ePOI locations good guidance to an exit can be given to devices and users in the event of an emergency.

It will be appreciated that the features described above allow the provision of ePOI headings and ranges, as well as linked ePOIs and linked beacons 30, to be provided without requiring the mobile device 11 to obtain any data from a device or system other than the beacon 30. Additionally, it does not require the device 11 to communicate with the beacon 30; the device can provide the notifications and headings after receiving messages passively from the beacon 30. It thus allows autonomous operation by mobile devices 11. Significantly, because the system is passive, it can support an unlimited number of users. Moreover, this is all achieved with the transmission of relatively little data by the beacon 30.

It will be appreciated that the above-described embodiments are not limiting on the scope of the invention, which is defined by the appended claims and their alternatives. Various alternative implementations will be envisaged by the skilled person, and all such alternatives are intended to be within the scope of the claims. A number of alternatives will now be described.

Although it is described above that the beacon 30 creates the PDUs that form part of the positioning advertisement messages, this step may be performed instead by the server 40. In this case, the PDUs are created by the server 40 and sent to the beacon 30, from where they are incorporated in positioning advertisement messages and broadcast. The server 40 thus causes the beacon 30 to transmit the PDUs. Here, the beacons 30 do not need to store information concerning POIs etc.

Although in the above the AoD positioning packets and the positioning advertisement messages are separate, they may instead be combined. For instance, an AoD tail can be added to a positioning advertisement message, allowing a mobile device 11, 12 to determine its position after having received only one message from a beacon. However, the inclusion of the AoD tail limits the number of bits available for communicating the other information needed by the mobile devices 11, 12.

Although in the above the positioning advertisement messages are transmitted on BLE advertising channels, it will be appreciated that the information communicated to the mobile devices 11, 12 in the positioning advertisement messages need not be communicated in this way. For instance, the positioning advertisement messages may be broadcast on one or more BLE data channels, for instance in SCAN_RSP containers.

Indeed, the invention is not limited to BLE. It will be appreciated that the concept underlying the above-described embodiments, as defined in the claims, is applicable to other systems in which the same considerations (e.g. limited bandwidth, positioning resolution etc.) are applicable. Other systems to which the invention may be applied and which are intended to be covered by the claims include unidirectional and bidirectional systems both present and future. Systems to which the invention may be applied include WiFi systems, pseudolite-based systems and such like.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer.

A computer-readable medium may comprise a computer-readable storage medium that may be any tangible media or means that can contain or store the instructions for use by or in connection with an instruction execution system, apparatus, or device, such as a computer as defined previously.

According to various embodiments of the previous aspect of the present invention, the computer program according to any of the above aspects, may be implemented in a computer program product comprising a tangible computer-readable medium bearing computer program code embodied therein which can be used with the processor for the implementation of the functions described above.

Reference to "computer-readable storage medium", "computer program product", "tangibly embodied computer program" etc, or a "processor" or "processing circuit" etc. should be understood to encompass not only computers having differing architectures such as single/multi processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

The invention claimed is:

1. An apparatus, the apparatus comprising at least one processor and at least one memory having computer-readable code stored thereon which when executed controls the at least one processor to cause the apparatus to:
   transmit angle-of-departure positioning messages from which a mobile device can calculate a direction to the mobile device from the apparatus; and
   transmit a point of interest packet data unit for providing an emergency navigation service to a mobile device, the point of interest packet data unit comprising first data indicating a location of a first emergency point of interest and data indicating that the location relates to an emergency point of interest,
   wherein the location of the first emergency point of interest is different than a location of the apparatus, and
   wherein the point of interest packet data unit additionally comprises second data indicating a location of a second point of interest, third data indicating a location of a third point of interest, and data indicating that the locations of the second and third points of interest relate to emergency points of interest.

2. The apparatus as claimed in claim 1, wherein the point of interest packet data unit additionally comprises
   the location of the second point of interest.

3. The apparatus as claimed in claim 1, wherein the first data indicates a range from the location of the first emergency point of interest.

4. The apparatus as claimed in claim 1, wherein the packet data unit is transmitted in a first positioning message that is separate from the angle of departure positioning messages.

5. An apparatus, the apparatus comprising at least one processor and at least one memory having computer-readable code stored thereon which when executed controls the at least one processor to cause the apparatus to:
   receive at least one angle-of-departure positioning message from a positioning beacon;
   receive a point of interest packet data unit from the positioning beacon, the point of interest packet data unit comprising first data indicating a location of a first emergency point of interest and data indicating that the location relates to an emergency point of interest, wherein the location of the first emergency point of interest is different than a location of the positioning beacon;
   use the angle-of-departure positioning message to calculate a position of the apparatus; and
   when emergency navigation is enabled, to provide an output indicating a heading to the location of the first emergency point of interest,
   wherein the point of interest packet data unit additionally comprises second data indicating a location of a second point of interest and wherein the computer-readable code when executed controls the at least one processor, when emergency navigation is enabled, to cause the apparatus to provide an output indicating a range to the location of the second point of interest as well as a heading to the location of the second point of interest.

6. The apparatus as claimed in claim 5, wherein the computer-readable code when executed controls the at least one processor to cause the apparatus to:
   when emergency navigation is enabled, provide an output indicating a range to the location of the first point of interest as well as the heading to the first emergency point of interest.

7. A method comprising:
   transmitting angle-of-departure positioning messages from which a mobile device can calculate a direction to the mobile device from the apparatus; and
   transmitting a point of interest packet data unit for providing an emergency navigation service to a mobile device, the point of interest packet data unit comprising first data indicating a location of a first emergency point of interest and data indicating that the location relates to an emergency point of interest,
   wherein the location of the first emergency point of interest is different than a location of the apparatus, and
   wherein the point of interest packet data unit additionally comprises second data indicating a location of a second point of interest, third data indicating a location of a third point of interest, and data indicating that the locations of the second and third points of interest relate to emergency points of interest.

8. A method as claimed in claim 7, wherein the point of interest packet data unit additionally comprises
   data indicating a range from the location of the second point of interest.

9. The method as claimed in claim 7, wherein the first to third data are ordered in the point of interest packet data unit such that a distance between the locations of the first and second emergency points of interest is less than a distance between the locations of the first and third emergency points of interest.

10. A method comprising:
    receiving at least one angle-of-departure positioning message from a positioning beacon;
    receiving, at the apparatus, a point of interest packet data unit from the positioning beacon, the point of interest packet data unit comprising first data indicating a location of a first emergency point of interest and data indicating that the location relates to an emergency point of interest, wherein the location of the first emergency point of interest is different than a location of the positioning beacon;

using the angle-of-departure positioning message to calculate a position of the apparatus; and when emergency navigation is enabled, providing an output indicating a heading to the location of the first emergency point of interest, wherein the point of interest packet data unit additionally comprises second data indicating a location of a second point of interest and, when emergency navigation is enabled, providing an output indicating a range to the location of the second point of interest as well as a heading to the location of the second point of interest.

11. The method as claimed in claim 10, comprising:

when emergency navigation is enabled, providing an output indicating a range to the location of the first emergency point of interest as well as the heading to the first emergency point of interest.

\* \* \* \* \*